Feb. 4, 1969    D. D. McNOWN    3,425,446
ALTERNATE, VARIABLE TIMING CONTROL FOR HYDRAULIC DEVICES
Filed June 12, 1967    Sheet 1 of 2
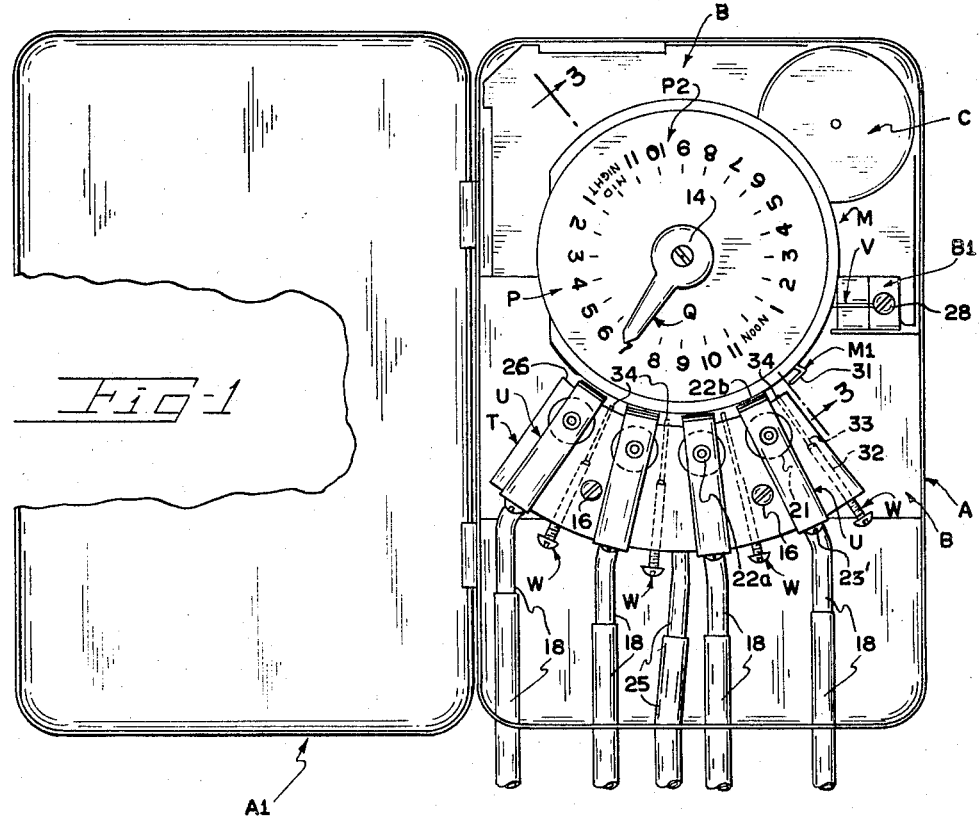
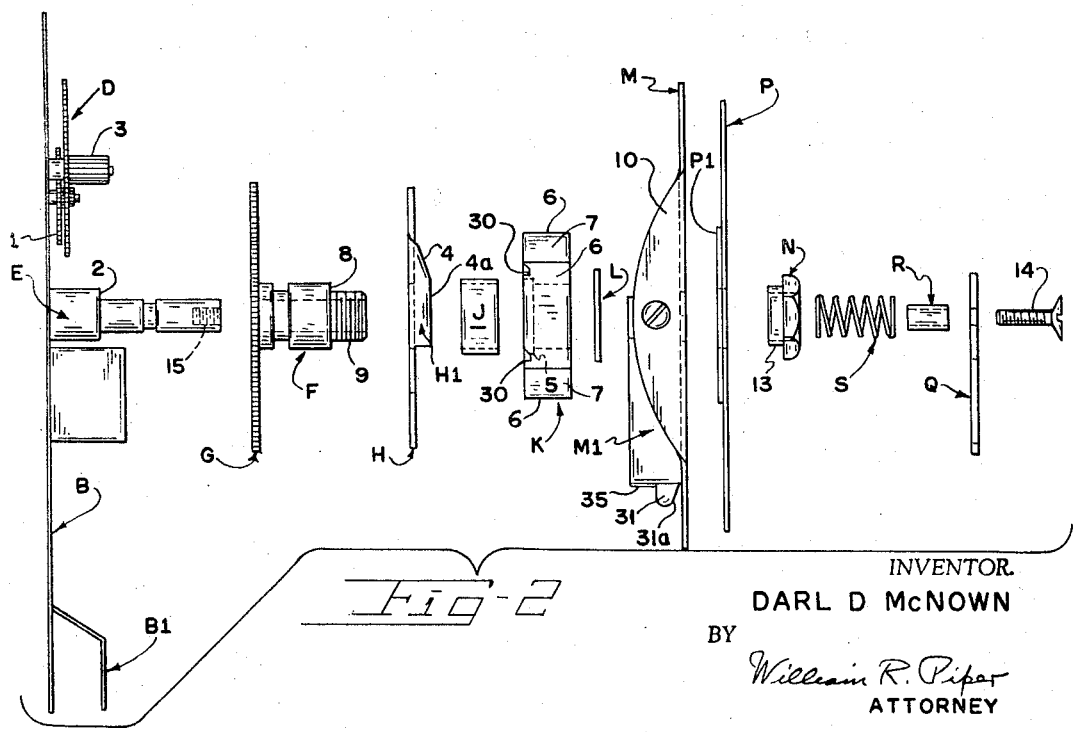
INVENTOR.
DARL D McNOWN
BY William R. Piper
ATTORNEY

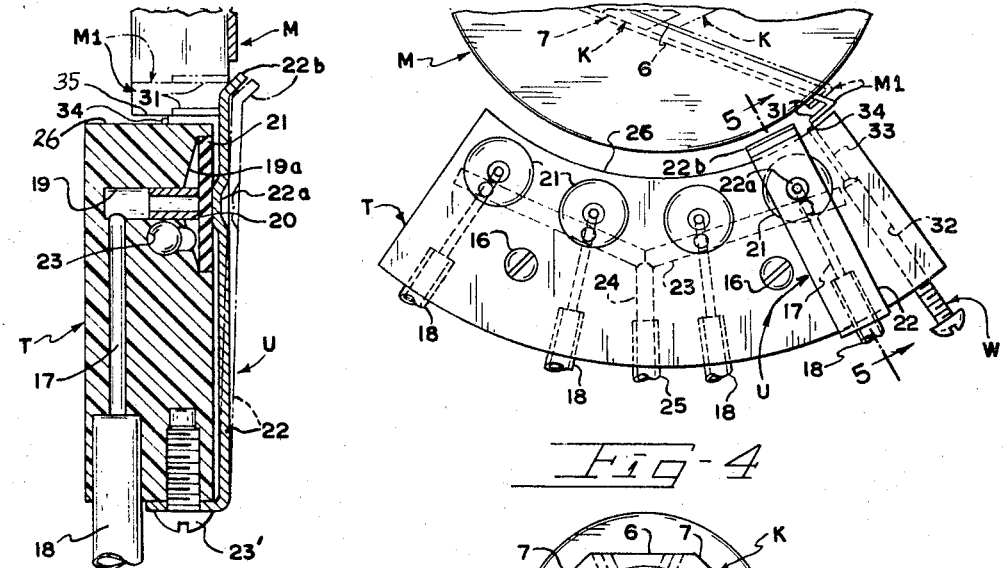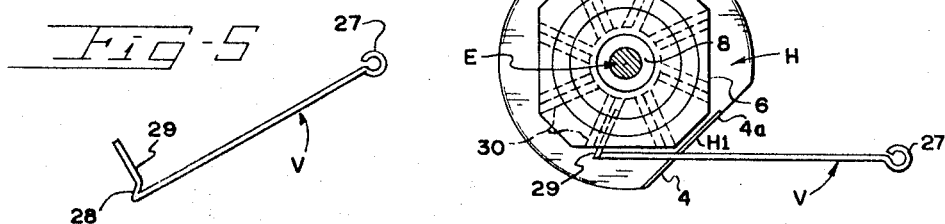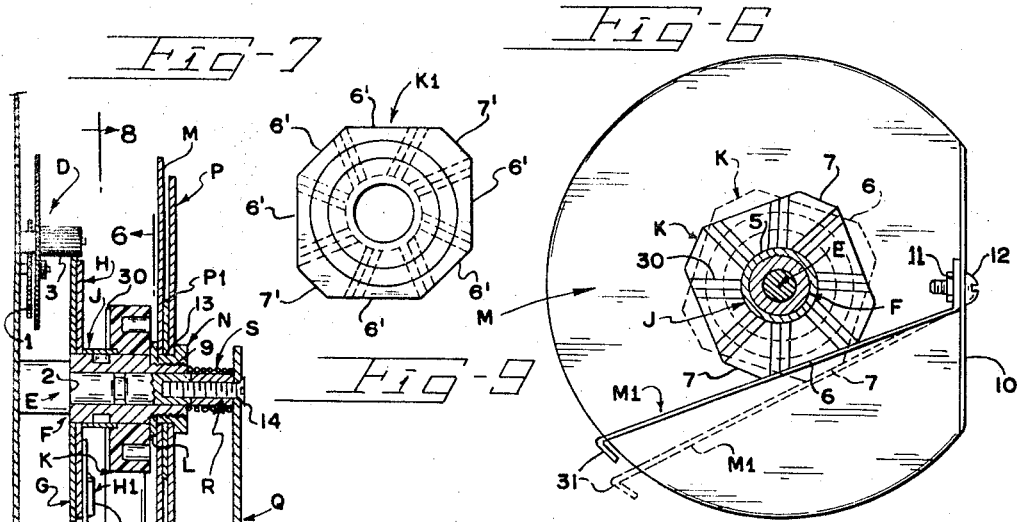

United States Patent Office 3,425,446
Patented Feb. 4, 1969

3,425,446
ALTERNATE, VARIABLE TIMING CONTROL FOR
HYDRAULIC DEVICES
Darl D. McNown, 1625 Yosemite Parkway,
Merced, Calif. 95340
Filed June 12, 1967, Ser. No. 645,413
U.S. Cl. 137—624.16        9 Claims
Int. Cl. F16k 11/16, 31/48; E02b 13/00

ABSTRACT OF THE DISCLOSURE

A clock controlled device for opening one or more hydraulic bleed-off lines in succession, the device being adjustable so that the clock will open the bleed-off lines at desired time intervals and for the length of time desired. Each bleed-off line controls a water valve and opens the valve only when the bleed-off line is opened. The device can open the bleed-off lines in succession every day, every second, fourth or eighth day and each line can be kept open from a few minutes to an hour. The water controlled valves can be used in an irrigation system or the like. The device also can be used for other fluid systems.

BACKGROUND OF THE INVENTION

Field of the invention

In water irrigating systems it is desirable to operate them at predetermined time intervals and for a certain length of time and without the need of an attendant. Some irrigating systems need to be operated every day or with one or more days intervening between each operation.

SUMMARY OF THE INVENTION

An object of my invention is to provide a clock controlled device in which a cam is rotated through one complete revolution every twenty-four hours. The cam has a plurality of high portions alternating with a like number of low portions and a cam follower is alternately moved into an operative valve opening position for a definite time period such as twenty-four hours and then is moved into an inoperative position for a like period of time. When the cam follower is in operative position, it will operate one or more pilot valves to open them in sequence and for a certain time interval. Each pilot valve controls a bleed line that in turn controls a water valve or other fluid valve. So long as a pilot valve is held open by the cam follower, the bleed line controlled by this pilot valve will remain open and will permit a very small quantity of water or other fluid to flow from the valve through the bleed line and past the open pilot valve. The water or other fluid valve will remain open just as long as the pilot valve remains open. Novel means is provided for adjusting the time period the pilot valve remains open each time the cam follower opens the pilot valve. About one quart of water or other fluid will flow through the bleed line for each hour the valve, controlled by the bleed line, remains open.

BRIEF DESCRIPTION OF THE DRAWINGS

FIGURE 1 is a plan view of my device, showing it mounted in a box with the cover of the box in open position.

FIGURE 2 shows an exploded view of the main parts of the device shown full size.

FIGURE 3 is a transverse section through the center of the stationary shaft and illustrates the various rotating parts that are mounted on the shaft.

FIGURE 4 is a full size plan view of the base that has a plurality of pilot valves and shows its relation to the cam follower.

FIGURE 5 is a radial section through the pilot valve base and shows one of the pilot valves twice full size.

FIGURE 6 is a section taken along the line 6—6 of FIGURE 3 and illustrates two of the cams and how they are rotated with respect to each other.

FIGURE 7 is an isometric view of the spring arm that is also shown in FIGURE 6 and is actuated by one of the cams for holding a second cam while the first cam rotates through a slight arc. This will occur each time the first cam makes a complete revolution.

FIGURE 8 is a section taken along the line 8—8 of FIGURE 3 and illustrates one of the cams in two different rotative positions with respect to the cam follower. The undersurface of the cam is shown in this figure.

FIGURE 9 shows a top plan view of a modified cam which is used when the device is to operate the pilot valves every fourth day.

DESCRIPTION OF THE PREFERRED EMBODIMENT

In carrying out my invention I provide a container indicated generally at A to house the device, see FIGURE 1. This container has a hinged cover A1 that when closed will protect the device. A plan view of the device is shown and it is removably mounted in the container or box. An axial section through the device is shown in FIGURE 3 and is taken along the line 3—3 of FIGURE 1.

The device comprises a base B, see FIGURES 1 to 3, inclusive that is removably mounted in the container or housing A and is secured in place by any means desired. An electric mechanism is enclosed in a casing C, and it has a pinion, not shown, that meshes with a gear 1 in a clock train of gears indicated generally at D, in FIGURES 2 and 3. The base B supports a stationary shaft E, that extends perpendicular thereto. The shaft has an annular shoulder 2. A hollow shaft F is rotatably mounted on the fixed shaft E, and bears against the shoulder 2. The hollow shaft has a gear G, rigidly mounted thereon and this gear meshes with a gear 3 in the train of gears D. The train of gears is so designed that the gear G will be rotated once every twenty-four hours by the electric clock C.

A cam-carrying disc H is mounted on the hollow shaft F and is secured to the shaft and to the gear G so as to rotate as a unit therewith. FIGURES 2, 3 and 6 show the disc H with an upwardly bent portion that forms the disc-cam H1. The gear G, disc H and its disc-cams H1 are rotated in a clockwise direction when looking at FIGURE 6. The cam has an inclined edge 4 that extends from the outer surface of the disc H to an edge 4a on the cam that parallels the plane of the disc. The purpose of the disc-cam H1 will be explained hereinafter.

FIGURE 3 shows a spacing sleeve J mounted on the rotatable hollow shaft F and having one end bearing against the outer surface of the disc H. A polygon cam K is rotatably mounted on the hollow shaft F and it has an annular groove 5, see FIGURE 2, for receiving the adjacent end of the spacing sleeve J. The cam K has a plurality of low points or peripheral portions 6 that alternate with an equal number of high points or peripheral portions 7, see FIGURES 6 and 8. The top surface of the polygon cam K lies flush with an annular shoulder 8 provided on the hollow rotatable shaft F, see FIGURES 2 and 3. The hollow shaft has a reduced cylindrical portion 9 that is externally threaded. A friction washer L is mounted on the reduced portion 9 and it frictionally contacts with the adjacent top surface of the polygon cam K.

A disc M has a central opening for receiving the reduced cylindrical portion 9 of the hollow shaft F and this disc has a downwardly bent portion 10 that carries a leaf spring M1, see FIGURE 8, which functions as a cam follower as well as a clutch for connecting the polygon cam K to the disc for rotation therewith. The cam follower serves an additional function for operating pilot valves which will be described hereinafter. The spring-biased cam follower M1 has a bent base portion 11 that is secured to the downwardly bent portion 10 of the disc M, by a bolt 12, or other suitable fastening means. FIGURE 3 shows the friction washer L connecting the polygon cam K to the disc M so that normally both will rotate together. Before describing the function of the cam follower M1, I will set forth the remaining parts that are mounted either on the rotatable hollow shaft F or on the stationary shaft E.

In FIGURES 2 and 3, I show a hollow nut N that has a threaded bore adapted to receive the reduced threaded portion 9 of the hollow shaft F. The hollow nut N clamps the disc M and the washer L to the shoulder 8 of the hollow shaft F so that a rotation of the shaft will also rotate the disc M. The cylindrical portion 13 of the hollow nut N has a twenty-four hour dial P and a friction washer P1 mounted thereon. The head of the hollow nut N holds the dial P and friction washer P1 in clamping relation to the disc M, so that the disc, washer and dial will rotate as a unit with the hollow shaft F.

I mount a time indicating stationary pointer Q on the end of the stationary shaft E, see FIGURES 2 and 3, and this is accomplished by a screw 14 and a spacing sleeve R. The outer end of the shaft E has a threaded bore 15 for receiving the end of the screw 14. The screw is tightened for rigidly connecting the stationary time-indicating pointer Q to the stationary shaft E. A coil spring S is mounted on the spacing sleeve R and has one end bearing against the outer end of the stationary shaft E and its other end bearing against the undersurface of the pointer Q. The outer diameter of the sleeve R is the same as the outer diameter of the stationary shaft E on which the hollow rotatable shaft F is slidably mounted.

The twenty-four hour indicating dial P makes one revolution every twenty-four hours and it has time-indicating numerals on its outer face and indicated at P2. The circular row of numerals P2 has the words "NOON" and "MIDNIGHT" spaced diametrically opposite each other to divide the numerals into two groups, one group indicating daytime and the other indicating nighttime. When it is necessary to initially set the dial P with respect to the stationary pointer Q so as to indicate the correct time of day or night, the operator can grasp the disc M at its rim and pull outwardly so as to move the hollow shaft F partially onto the sleeve R and compress the coil spring S. This will free the gear G from the pinion 3 of the clock train and the disc M and dial P can be rotated in a clockwise direction until the pointer Q indicates the correct time of day on the dial. The disc M may now be freed and the spring S will move the hollow shaft F so as to again mesh the gear G with the drive pinion 3.

I will now describe the pilot valve structure and how the cam follower M1 operates to successively open the pilot valves at predetermined times and for predetermined lengths of time during one twenty-four hour period and then will not operate the pilot valves during the next twenty-four hour period. This operation is automatically repeated so that every other twenty-four hour period the pilot valves will be operated. In FIGURES 1, 4 and 5, I show a base T that has one or more pilot valves indicated generally at U. Four pilot valves U are provided in the present base T. A description of one of these pilot valves will suffice for all of the rest.

The pilot valve base T is secured to the base B of the device by screws 16, shown in FIGURE 1. Only one of the pilot valves U is shown in complete detail in FIGURES 4 and 5 and this one will be described. The base T has an inlet fluid passage 17 to which a bleed line 18 communicates. The bleed line 18 extends through an opening in the end wall of the box 19, see FIGURE 1 and connects with water valve, not shown. As already stated, the water valve is of the type that when the bleed line 18 is open to permit water to flow therethrough from the water valve, this will open the water valve to permit water to flow therethrough for any purpose desired. As soon as the bleed line 18 is closed by the pilot valve U, the water valve will be closed. Such a water valve is of standard construction and does not need to be illustrated.

The fluid passage 17 in the base T communicates with another fluid passage 19, see FIGURE 5, that extends to the top of the pilot valve base. A tubular valve seat 20 communicates with the fluid passage 19 and a disc valve receiving compartment 19a surrounds the exposed end of the tubular member 20. A flexible disc valve 21 closes the entrance to the compartment 19a and the center of the disc valve is yieldingly held in seated position by a leaf spring 22 so that the valve seat 20 is normally kept closed and no fluid can pass from the passage 19 into the compartment 19a. One end of the leaf spring 22 is bent at right angles and is secured to the pilot valve base by a screw 23′, see FIGURE 5. The leaf spring 22 overlies the top of the pilot valve base T and it has a depressed portion 22a that bears against the center of the disc valve 21 to keep it seated against the outer end of the tubular valve seat 20. The periphery of the disc valve 21 is preferably cemented to the circular rim of the compartment 19a.

A fluid outlet passage 23 communicates with the compartment 19a in back of the disc valve 21, see FIGURE 5. This passage leads to a common fluid outlet passage 24 for all four pilot valves U, see FIGURE 4. A fluid outlet tube 25, see FIGURES 1 and 4, communicates with the outlet passage 24 and extends through an opening in the wall of the container A. The free end 22b of the leaf spring 22 is bent upwardly at a slight angle as shown in FIGURE 5. The leaf spring 22 projects beyond the inner arcuate edge 26 of the pilot valve base T, see FIGURES 1, 4 and 5, and this will dispose the leaf spring end in the path of the outer end of the follower M1 when the latter is moved into its outermost position by contacting with a high point 7 of the polygon cam K as shown by the full line position in FIGURE 4. When the cam follower M1 is in its innermost position by contacting with a low point 6 of the cam K, the outer end of the cam follower will be out of line with the leaf spring inner end 22b and will not lift the spring to permit the disc valve 21 to open. The innermost position of the cam follower M1 is shown in dot dash lines in FIGURE 4 and the mechanism for accomplishing this will now be described.

FIGURES 1 and 3 show the base B with a raised portion B1 and a spring biased wire cam follower V has one end 27 formed into a loop and secured to the raised portion by a screw 28. The wire cam follower V is shown in plan view in FIGURE 6 and in isometric view in FIGURE 7. The free end of the wire cam follower has its free inner end riding on the exposed outer surface of the cam-carrying disc H, see FIGURE 3. This inner end of the wire cam follower V then has an upwardly extending portion 28, see FIGURE 7, and a substantially radially extending cam engaging portion 29, see FIGURE 6. The upwardly extending portion 28 normally positions the radially extending end just below the undersurface of the polygon cam K. FIGURE 8 shows the undersurface of the cam K provided with radially extending slots 30 that are adapted to successively receive the cam engaging portion 29 of the wire cam follower V. There are as many radial slots 30 as there are low and high lobes 6 and 7 on the periphery of the cam.

The cam-carrying disc H makes one revolution every twenty-four hours because it is attached to the gear G and to the hollow shaft F. The disc M and the time-indicating dial P also make one revolution every twenty-four hours with the gear G, because they are clamped to the hollow shaft F by the nut N, see FIGURE 3. The polygon cam K can be rotated on the hollow shaft F, but the sleeve J bearing against one end of the cam and the friction washer L bearing against the other end, will cause the cam to normally rotate with the hollow shaft. However, once every twenty-four hours or once for each complete rotation of the cam-carrying disc H, the integral cam H1 on the disc will be moved under the wire cam follower V. First the inclined edge portion 4 will move under the wire cam follower V and will flex it for raising the radial end 29 thereof into one of the radial slots 30 in the polygon cam K that is positioned directly above this radial end. The wire cam follower will now prevent any further clockwise rotation of the polygon cam K because the radial end 29 will contact with the edge of the slot 30 that extends at right angles to the plane of the undersurface of the cam.

The gear G and hollow shaft F will continue to rotate the disc H clockwise while the wire cam follower V holds the polygon cam K from rotating until the edge 4a of the cam H1 passes completely by the cam follower whereupon the cam H1 frees it and the resiliency of the wire cam follower will return it into contact with the exposed face of the disc H and the radial portion 29 of the follower will again free the polygon cam K. The length of the cam edge 4a is predetermined so that the cam follower M1 of the disc M will move from say one of the low peripheral lobes 6 on the polygon K to the next high peripheral lobe 7. FIGURE 8 shows such a movement but the undersurfaces of the cam K and disc M are shown and therefore the disc would be rotating counterclockwise in this figure. Also in order to illustrate how the angle of the cam follower M1 is swung from the full line position where it contacts with a low lobe 6 of the cam K, into the dot dash line position where it contacts an adjacent high lobe of the cam, the disc M remains in the same position while the cam K is rotated into the dot-dash position. In actual operation, the reverse is true. The two positions of the cam follower M1 are clearly shown in FIGURE 8. When once the polygon cam K is freed from the cam follower V, it will continue to rotate at a speed of one complete revolution every twenty-four hours.

It will be noted from FIGURE 2, that the outer end of the cam follower M1 has a portion 31 bent into an arcuate shape, see FIGURE 1, so as to follow the arcuate edge 25 of the pilot valve base T as the follower is moved by the rotating disc M. FIGURES 4, 5 and 8 indicate two positions of the cam follower M1. When a high peripheral lobe portion 7 of the cam K contacts with the cam follower M1, the latter will be swung so as to position the arcuate end 31 near to the inner arcuate edge 25 of the base T and this will cause the end 31 to contact with the leaf spring 22 successively as the disc M moves the cam follower. Then when a low peripheral lobe 6 contacts with the cam follower M1, its outer end 31 will be swung into the dot-dash line position of FIGURES 4 and 5, and it will clear all of the leaf springs 22 as the disc M rotates.

FIGURE 2 shows the upper edge 31a of the end 31 of the cam follower M1, inclined so as to act as a cam edge for contacting the underside of the leaf spring 22 as the end 31 passes under the spring. As soon as the spring 22 is flexed upwardly, it will free the disc 21 and permit it to flex and expose the outer end of the tubular valve seat 20. The fluid which is under pressure in the bleed line 18 from the fluid valve, not shown, will lift the center of the disc valve 21 from its seat 20, and the bleed water will flow into the compartment 19a and then into the passages 23 and 24, see FIGURE 4 and it will escape through the fluid outlet line 25. So long as the leaf spring 22 is kept in raised position, the fluid valve, not shown, will remain open. As soon as the end 31 of the cam follower M1 frees the leaf spring 22, it will close the disc valve 21 and again cause it to close the valve seat 20. The fluid in the bleed line 18 will be stopped from flowing and this will close the fluid valve.

I provide novel means for predetermining the time the leaf spring 22 will remain flexed by the end 31 of the cam follower M1. In FIGURES 1 and 4, I show an adjusting screw W for each pilot valve U. The pilot valve base T has radially extending threaded bores 32 for receiving the screws W. The bores 32 have their inner ends communicating with aligned smooth bores 33 of a smaller diameter and pins 34 are slidable in these bores and are integral with the inner ends of the adjusting screws W.

The leaf spring 22 has a certain width and it will require the end 31 of the cam follower M1 approximately one hour to pass from one side of the leaf spring to the other side. This means that the pilot valve U, associated with this leaf spring will remain open for a like period of time. If the operator desires to shorten this time, he rotates the screw W to move its pin 34 into the path of the end 31. The exposed inner end of the pin will be positioned below the arcuate end portion 31 of the cam follower M1 and will contact with the vertical edge portion 35, see FIGURE 5, and temporarily arrest its movement. The continued rotation of the disc M will cause the cam follower M1 to flex until it reaches a point where the edge 35 will be moved clear of the pin. It takes a certain length of time for this to occur and during this time the pilot valve associated with the leaf spring will remain closed. Finally when the edge 35 does clear the pin 34, the flexed cam follower M1 will immediately snap back into normal position and the arcuate end portion 31 will hold the pilot valve open for the remainder of the time it moves under the leaf spring 22. In this way the actual time for the pilot valve to remain open can be varied from as little as five minutes up to the full hour although I do not wish to be limited to any precise time periods. The adjusting screws W for the different pilot valves may be adjusted differently so as to vary the times the different pilot valves will remain open.

OPERATION

From the foregoing description of the various parts of my device, the operation thereof may be readily understood.

The electric clock C will rotate the gear G, the disc M, and the dial P through one revolution every twenty-four hours. The polygon cam K will be rotated with the disc M because of the friction washer L. If the cam follower M1 should be contacting one of the peripheral high points 7 of the cam K, the end 31 of the follower would be in the full line position shown in FIGURE 4, and the cam edge 31a of the end, see FIGURE 2, would move successively under each of the leaf springs 22 and open the pilot valves U in succession in the manner already described.

Before the disc M would again complete another revolution, the cam H1 on the cam disc H would move under the wire cam follower V, see FIGURE 6, and would flex the free end 29 of the follower upwardly, for moving it into a registering groove 30 on the underside of the polygon cam K. The end 29 would prevent further rotation of the cam K with the disc M. The disc M will continue to rotate and will move its cam follower M1 from the high lobe 7 of the cam K to the adjacent low lobe 6. FIGURE 4 illustrates when the cam follower M1 contacts with a low lobe 6 of the cam K, the outer end 31 of the cam follower will be moved into the dot-dash line position. This will cause the end 31 to ride free of all of the leaf springs 22 of the pilot valves U as shown and none of the pilot valve will be opened. Then on the next complete revolution of the disc M, the polygon cam will again be held from rotation long enough by the cam H1 and the wire cam follower V to move the other cam follower M1 onto the next low lobe 6 of the polygon cam K. This will cause the pilot valve opening cycle to be repeated. So for each alternate twenty-four hour periods the pilot valves will be opened in sequence.

If the operator wishes to have the pilot valves U opened in sequence every twenty-four hours instead of every other twenty-four hour period, he loosens the screw 28 in FIGURE 1 and swings the wire cam follower V about the screw as a pivot so as to move the cam follower out of the path taken by the cam H1 as the disc H rotates. This will also move the bent portion 29 out from under the polygon cam K and therefore the polygon will not be held from rotating for a short time every twenty-four hours. The operator sees to it that the cam follower M1 rests on a high lobe 7 of the polygon cam K and now the cam follower will open the pilot valves in succession every twenty-four hours instead of alternate twenty-four hour periods.

In FIGURE 9, I show a modified form of polygon cam K1. This cam differs from the polygon cam K shown in FIGURE 6, in that the cam K1 has only two high lobes 7' instead of four high lobes 7 as shown in FIGURE 6. There are three successive low lobes 6' between each high lobe 7' on the polygon cam K1. The cam K1 when substituted for the cam K would cause the cam follower M1 to rest on each of the low lobes 6' for a twenty-four hour period and therefore the cam follower would open the pilot valves in succession every fourth day. Of course the wire cam follower V would be swung back into operative position where it would be engaged by the cam H1 every twenty-four hours and would engage and hold the polygon cam K1 from rotating long enough for the cam follower M1 to be moved onto the next lobe of the cam.

I have already described how the length of time each pilot valve remains open can be adjusted. This is accomplished by adjusting the screws W in the base T and moving the pins into line with the outer end 31 of the cam follower M1. The pins 34 will cause the cam follower M1 to flex before the follower is freed to lift the pilot valve leaf spring 22 and permit the disc 21 to open the passage 19. This shortens the time the pilot valve will remain open and correspondingly shortens the time the fluid valve, controlled by the pilot valve, will remain open.

The stationary pointer Q is pointed toward the last pilot valve U in FIGURE 1. The disc M is adjusted angularly with respect to the clock dial P so that the cam follower M1 will be ready to open the right hand pilot valve in the figure when the pointer Q indicates five o'clock in the morning on the clock dial. Any other time may be arbitrarily chosen to open the pilot valves in succession.

I claim:
1. In combination:
 (a) a first cam-carrying disc rotated by a clock mechanism;
 (b) a first cam mounted on said disc;
 (c) a polygon cam rotatable on the same axis as said disc and having high and low lobes on its periphery;
 (d) a cam-follower carrying disc rotatable on the same axis as said first-mentioned disc and being operatively connected to said first disc so as to rotate as a unit therewith;
 (e) a first cam-follower flexible arm supported by said cam-follower disc and being adapted to successively contact with the peripheral lobes on said polygon cam, the outer end of said cam follower being disposed farther from the center of said cam-follower disc when said cam follower contacts a high lobe than when it contacts a low lobe;
 (f) a second cam-follower flexible arm having one end connected to a stationary support and its free end lying in the path of the first cam;
 (g) interlocking means carried by said second cam-follower and said polygon cam and actuated by said first cam during each revolution of its disc for holding said polygon cam from rotating long enough to permit said first cam-follower to contact with the next succeeding lobe on said cam;
 (h) at least one valve having valve-operating means lying in the path of the outer end of said first cam follower when the latter contacts with a high cam lobe;
 (i) whereby the outer end of said first cam follower will actuate said valve operating means as said first cam-carrying disc moves said first cam follower past said valve.

2. The combination as set forth in claim 1: and in which
 (a) further rotation of said first cam-carrying disc will cause said first cam to actuate said second cam-follower to stop rotation of said polygon cam until said first cam-follower contacts with a low lobe on said polygon cam;
 (b) whereby the outer end of said first cam follower will be moved out of the path of said valve-operating means and will not actuate said valve operating means as said first cam-carrying disc moves said first cam follower past said valve.

3. The combination as set forth in claim 1: and in which
 (a) said valve-operating means includes a leaf spring normally keeping the valve closed, said leaf spring having a predetermined width which is traversed by the outer end of said first cam follower when the latter lies in the path of said valve-operating means;
 (b) whereby said valve-operating means will hold said valve open so long as the time it takes for said cam-follower carrying disc to move said first cam follower and cause its outer end to move clear across the width of said leaf spring.

4. The combination as set forth in claim 3: and in which
 (a) an adjustable pin is associated with said valve;
 (b) means for moving the end of said pin into the path of the outer end of said first cam follower when said end is positioned so as to be moving in a path to actuate said valve-operating means;
 (c) whereby said pin end will temporarily stop the movement of said first cam follower outer end before the end contacts with said leaf spring and will cause the cam follower to flex until said outer end will ride free of said pin end and will quickly move under a portion of said leaf spring to hold the latter in valve opening position for a shorter time period than where said cam follower is not flexed.

5. The combination as set forth in claim 1: and in which
 (a) said interlocking means includes, the polygon cam having radially extending recesses equal in number to the total number of the high and low lobes thereon; and
 (b) said second cam follower has its free end provided with a radially extending portion that is positioned adjacent to the portion of said polygon that has the radially extending recesses therein, one of the recesses being in registration with the radially extending portion of said second cam follower;
 (c) whereby said first cam will actuate said second cam follower for each revolution of said first cam-carrying disc and will cause said radially extending portion of said second cam follower to enter the registering radially extending recess in said polygon cam for holding said polygon cam from rotating until said cam-follower carrying disc rotates and carries said first cam-follower into contact with the next succeeding low lobe on said polygon cam whereupon said first cam will release said second cam follower and the outer end of said first cam follower will be moved out of the path of the value-operating means and will not actuate said means.

6. In a device of the type described:
 (a) a base having a fluid passage therein opening into a compartment, the passage being provided with a valve seat that extends partly into said compartment;
 (b) a flexible disc constituting one wall of said compartment and overlying said valve seat;
 (c) a leaf spring yieldingly contacting with said disc and pressing it against said valve seat for closing it;

(d) a second fluid passage communicating with said compartment and being placed in communication with first fluid passage when said leaf spring is flexed for freeing the disc and opening said valve seat; and
(e) time-controlled means for contacting with the free end of said leaf spring for flexing it for freeing said disc.

7. The combination as set forth in claim 6: and in which
(a) said leaf spring has a predetermined width;
(b) said time-controlled means including an arm that is moved transversely across the width of said leaf spring in a predetermined time interval and holding the leaf spring flexed and freeing said disc during this time interval;
(c) whereby the valve seat will be freed from said disc during this period of time.

8. The combination as set forth in claim 7: and in which
(a) said arm being flexible and having an end that is moved transversely across the width of said leaf spring during a predetermined time interval; and
(b) an adjustable pin movable into the path of the end of the flexible arm for temporarily preventing the arm end from contacting with said leaf spring for flexing it;
(c) said constantly moving arm being flexed as the arm end is temporarily held from moving toward said leaf spring by said pin, this flexing of the arm continuing until the arm end is pulled free of said pin;
(d) whereupon said flexible arm will immediately return to normal position and cause its end to move quickly for a predetermined distance across a portion of the width of said leaf spring for flexing the latter and freeing said valve seat from said disc, said leaf spring being held in flexed position during the remaining time-controlled movement of said arm end across the entire width of said leaf spring.

9. The combination as set forth in claim 7: and in which
(a) said time controlled means includes means for moving said arm transversely across the width of said leaf spring at predetermined time intervals for flexing said spring for freeing said valve seat from said disc;
(b) said arm moving means being adjusted for causing said arm to flex said leaf spring every other time said arm is moved past said leaf spring.

References Cited

UNITED STATES PATENTS

| 2,497,557 | 2/1950 | Reeves | 251—331 XR |
| 2,875,428 | 2/1959 | Griswold | 137—624.16 |
| 2,940,317 | 6/1960 | Goodhouse | 74—3.52 |
| 3,229,956 | 1/1966 | White | 251—331 XR |
| 3,360,003 | 12/1967 | Parker | 137—451 XR |

WILLIAM F. O'DEA, *Primary Examiner.*

R. G. NILSON, *Assistant Examiner.*

U.S. Cl. X.R.

137—624.2; 251—263, 331